United States Patent [19]
Case et al.

[11] Patent Number: 5,699,120
[45] Date of Patent: Dec. 16, 1997

[54] MOTION VECTOR USING A TRANSFORM FUNCTION IDENTIFICATION SIGNAL

[75] Inventors: Shaun T. Case, Grass Valley; Raymond C. Blackham, Penn Valley, both of Calif.

[73] Assignee: Tektronix, Inc., Wilsonville, Oreg.

[21] Appl. No.: 542,963

[22] Filed: Oct. 13, 1995

[51] Int. Cl.$^6$ ........................................ H04N 7/24
[52] U.S. Cl. ........................... 348/407; 348/699
[58] Field of Search ............................... 348/404, 403, 348/407, 402, 401, 400, 416, 413, 412, 411, 699, 415, 409, 390, 384; 382/250, 248, 238, 236, 232; H04N 7/133

[56] References Cited

U.S. PATENT DOCUMENTS 5,068,724  11/1991  Krause et al. ........................ 348/402
5,495,244   2/1996  Je-Chang et al. ..................... 348/404

OTHER PUBLICATIONS

"Motion Compensated Compression of Computer Animation Frames", Brian K. Guenter, Hee Cheol Yun and Russell M. Mersereau, Computer Graphics Proceedings, Annual Conference Series Aug. 1993, ACM-0-89791-601-8/93/008/0297, pp. 297–304.

"Accelerated MPEG Compression of Dynamic Polygonal Scenes", Dan S. Wallach Sharma Kunapalli and Michael F. Cohen, Computer Graphics Proceedings, Annual Conference Series, Jul. 1994, ACM-0-89791-667-0/94/007/0193, pp. 193–196.

*Primary Examiner*—Tommy P. Chin
*Assistant Examiner*—Bryan S. Tung
*Attorney, Agent, or Firm*—Francis I. Gray

[57] ABSTRACT

A digital picture manipulator processes a video image signal according to a transform function and outputs both a transformed vide image signal and a transform function information signal. A compressed video encoder uses the transform function information signal in simplifying its search algorithms to generate motion vectors to compress the transformed video image signal to produce a compressed video image signal which includes the generated motion vectors. The compressed video image signal may be transmitted to a receiver, where it is decoded using the motion vectors and displayed. The compressed video image signal also may be subsequently decoded for processing by a subsequent digital picture manipulator. The motion vectors used by the decoder together with the transform function information signal from the subsequent digital picture manipulator are combined in a buffer/motion estimator to produce a modified transform function information signal for a subsequent compressed video encoder. The subsequent compressed video encoder compresses the transformed video image signal from the subsequent digital picture manipulator as a function of the modified transform information signal to produce a subsequent compressed video image signal.

7 Claims, 4 Drawing Sheets

MOTION VECTOR USING A TRANSFORM FUNCTION IDENTIFICATION SIGNAL

BACKGROUND OF THE INVENTION

The present invention relates to video data compression, and more particularly to integration of a video transformation device and a compressed video encoder in order to efficiently generate motion vectors for arbitrary quadrilaterals.

A digital picture manipulator, such as the Kaleidoscope, DPM 100, DPM 700 or DPM 4300 manufactured by The Grass Valley Group, Inc. of Grass Valley, Calif., United States of America, alters the appearance of a video image signal so that the image appears to have been shrunk, moved along some arbitrary axis, rotated, skewed, rolled up, turned like a page or otherwise altered in perspective, as shown in FIG. 1. Certain classes of video encoders, including MPEG-2 video encoders, compress video by looking at several frames, i.e., snapshots in time, and searching for similar blocks of pixels that have moved between frames, as shown in FIG. 2. This data may be encoded as a displacement (motion) vector and set of differences between a block of pixels in a first picture and a corresponding block of pixels in a second picture. Although this technique may give very good results, as it greatly compresses the picture, it is computationally very expensive.

One of the most computationally expensive parts of compression schemes is the search for the motion or displacement vectors. Most current compression schemes that use motion vectors use rectangularly-shaped blocks of pixels. However recent proposals since 1991 have been made to relax the restriction on the block shape from square to arbitrary quadrilaterals, as shown in FIG. 3. This type of algorithm is needed if the video is being transformed by a digital video effects device or if there is a lot of non-translational camera motion, such as rotation or zooming. Referring to FIGS. 1 and 3 the video encoder may spend a great deal of time searching for displacement caused by a digital picture manipulator in transforming a video image signal.

What is desired is a method of generating motion vectors for a compressed video encoder which reduces the computational overhead in the search algorithm used by the video encoder.

SUMMARY OF THE INVENTION

Accordingly the present invention provides motion vector generation for a compressed video encoder by communicating to the compressed video encoder information about an image transform used by a digital picture manipulator device for use in compressing a video image signal. The neighborhood in which good similar block matches are likely to be found is specified from the transformation information, greatly reducing motion vector search time, especially for arbitrary quadrilaterals. The transmitted transform is integrated into the compressed video encoder which performs motion estimation and prediction based upon the transform.

The objects, advantages and other novel features of the present invention are apparent from the following detailed description when read in conjunction with the appended claims and attached drawing.

DESCRIPTION OF THE PREFERRED EMBODIMENT

Figure 1:
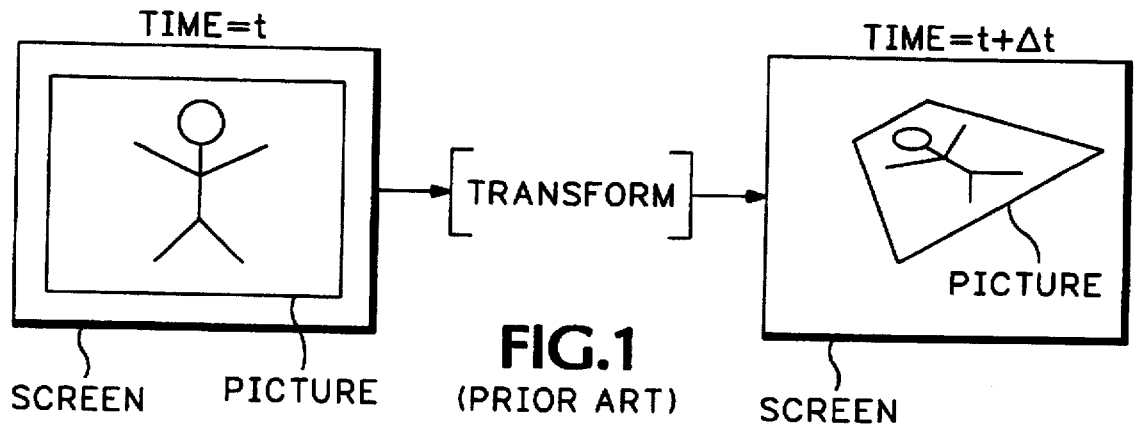
FIG. 1 is a graphic illustration of an image transform applied to a video image signal by a digital picture manipulator according to the prior art.
Figure 2:
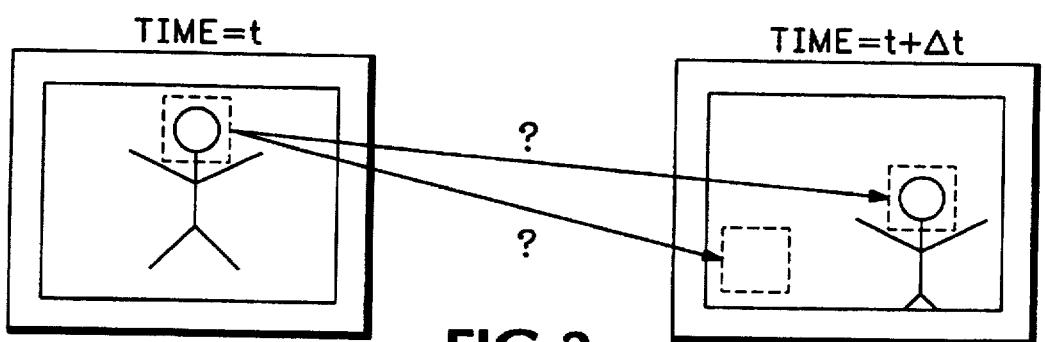
FIG. 2 is a graphic illustration of a search for a motion vector for a block of pixels by a compressed video encoder according to the prior art.
Figure 3:
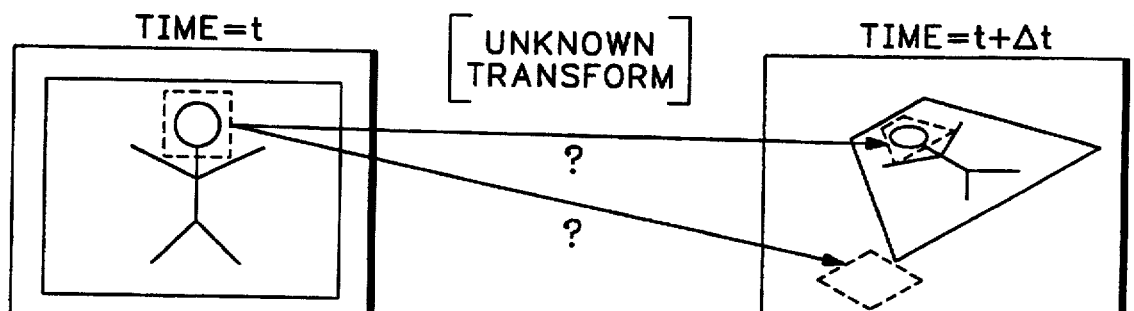
FIG. 3 is a graphic illustration of a search for generating a motion vector for arbitrary quadrilaterals of similar pixels by a compressed video encoder according to the prior art.
Figure 4:
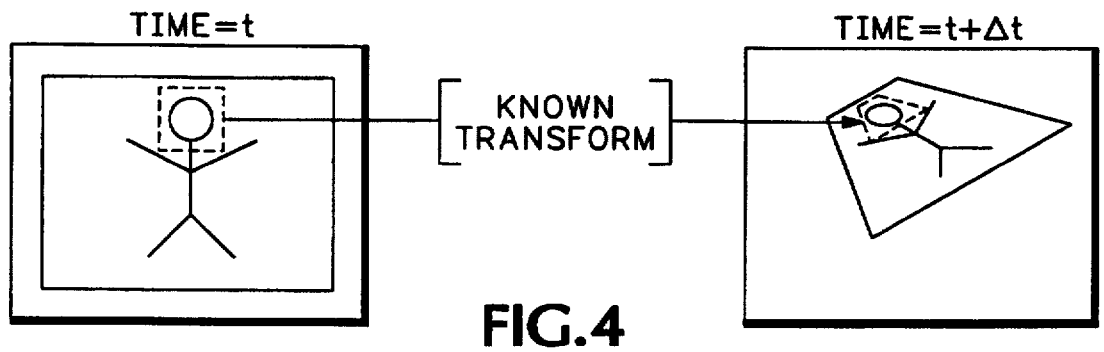
FIG. 4 is a graphic illustration of a search for generating a motion vector for arbitrary quadrilaterals of pixels by a compressed video encoder based upon a known image transform by a digital picture manipulator according to the present invention.
Figure 5:
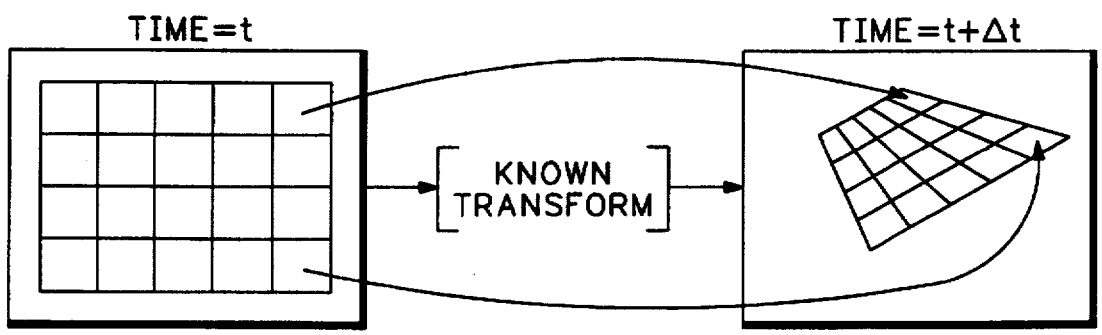
FIG. 5 is a graphic illustration of a one-to-one mapping of input quadrilaterals to output arbitrary quadrilaterals using a known image transform according to the present invention.

Referring now to FIGS. 4 and 5 the basic concept of motion vector generation for a compressed video encoder is illustrated. The image transform used by a digital picture manipulator is transmitted to the compressed video encoder so that the neighborhood in which good similar-block matches are likely to occur is specified. This is effective because the ideal motion vector for which the compressed video encoder is searching may be generated exactly, or very closely depending upon the amount of motion within the video image signal, from the image transform used by the digital picture manipulator. Communicating the image transform used, either in matrix form or some other form useful to the compressed video encoder, increases the effectiveness of a limited-neighborhood search for the encoder for normal interframe picture-content motion as shown in FIG. 2. Alternatively if the picture is broken up into rectangular elements, each one maps to an arbitrary quadrilateral on the output picture according to the image transform function. This mapping of input elements to output elements is what the compressed video encoder is looking for, and is passed along to the encoder with the video image signal for compression. Besides providing useful information between input and output pixel blocks, the transform used by the digital picture manipulator describes the displacement (motion) vector for each transformed pixel block as well as the shape.

Figure 6:
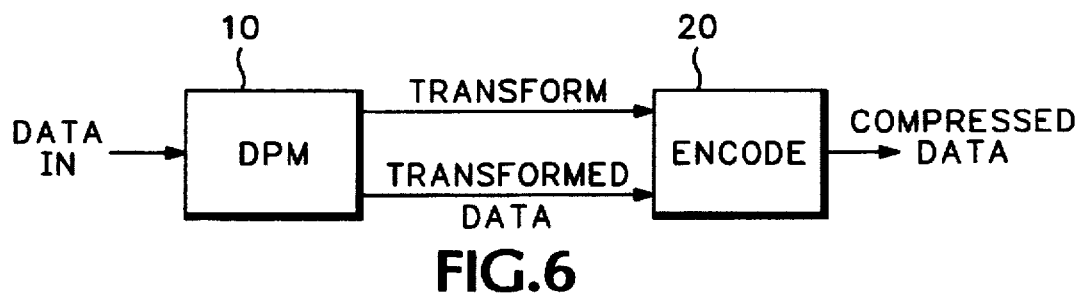
FIG. 6 is a block diagram view of a system for motion vector generation for a compressed video encoder according to the present invention.

Generally as shown in FIG. 6 a video image signal is input to a digital picture manipulator (DPM) 10. The DPM 10 performs a desired transformation on the video image signal according to a specified transform function and outputs a transformed video image signal. The DPM 10 also provides as an output information about the transform function. The transformed video image signal and the transform function information are input to a compressed video encoder 20. The compressed video encoder 20 compresses the transformed image signal using the transform function information to generate motion vectors in order to minimize the search for comparable pixel blocks from frame to frame of the transformed image signal.

Figure 7:
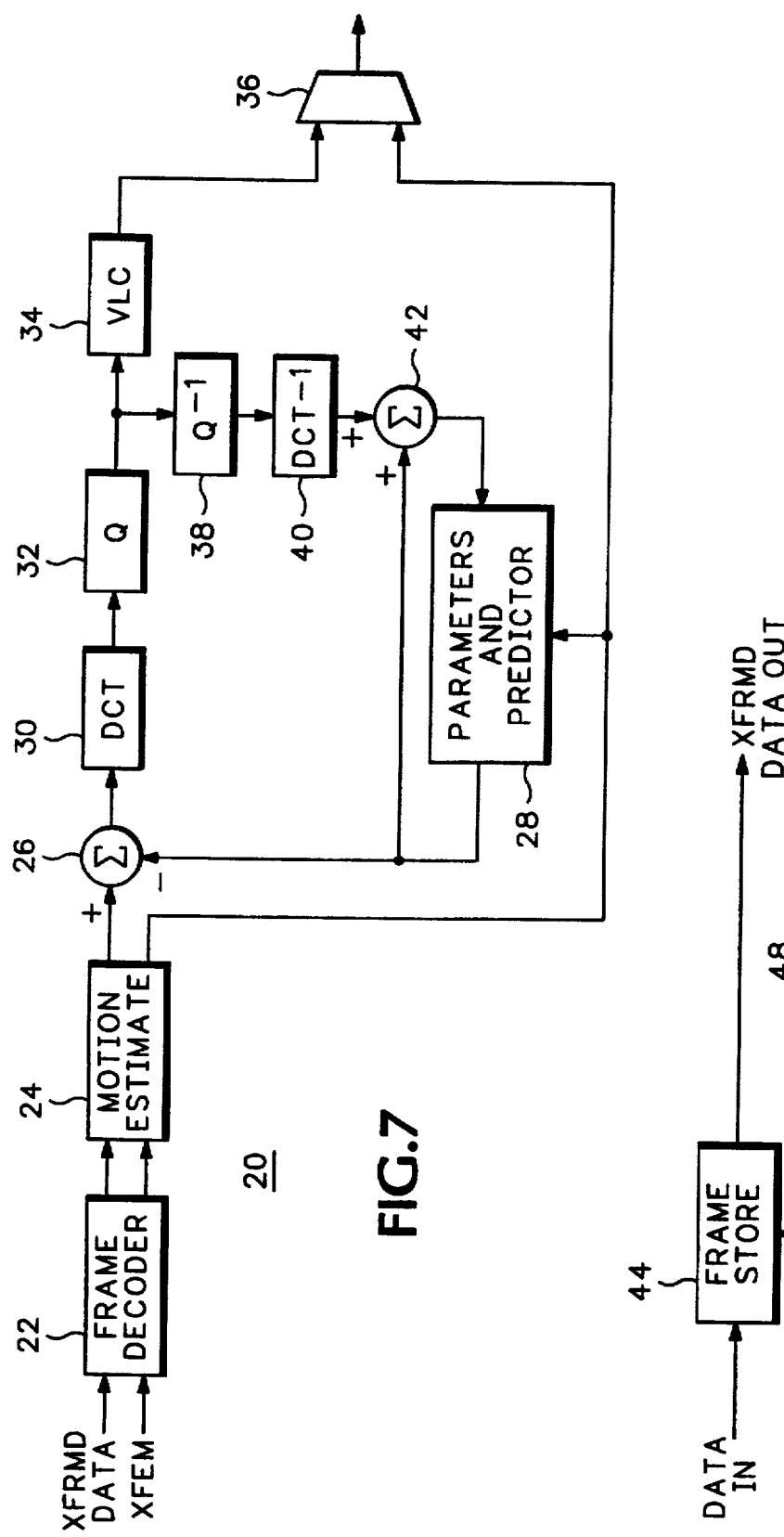
FIG. 7 is a block diagram view of a compressed video encoder generating motion vectors from a known image transform according to the present invention.

An MPEG video encoder device is shown in FIG. 7 as modified to become the compressed video encoder 20 according to the present invention. The basic blocks of the MPEG video encoder device are basically unchanged except that the input is modified to accept and process the transform function information. The transformed video signal together with the transform function information is input to a frame reordering circuit 22, which puts the frames of the video image signal into a proper order, and then to a motion estimator 24, which estimates the motion of each block within a video image. As is well known in the art, the frame re-ordering circuit allows the compressor to "look into the future" at frames that occur later in time. For example a series of frames in sequence 1-2-3-4 may be reordered for the compressor as 1-4-2-3 so that bidirectional frames, 2 and 3, arrive after their predecessor and successor frames so that the compression pipeline doesn't "starve" while it waits for images from the future. The motion estimator 24 uses the transform function information in a search algorithm to generate motion vectors. Since the motion vector generated from the image transform function of the DPM is nearly optimal in most cases, the computationally expensive step of searching for a motion vector may be eliminated or reduced significantly. Instead of doing an exhaustive or other kind of search, the motion estimator 24 gets an excellent starting point and may use its resources to search for an unlikely but possibly better fit. Additionally the motion estimator 24 supports compression on arbitrary quadrilaterals instead of square ones, also with minimal or no searching. In fact the motion estimator 24 may take the transform function information and directly generate a very-likely-ideal motion vector with no searching, depending upon the implementation. In short the motion estimator 24 uses a restricted search neighborhood which results in a computational savings of at least one or two orders of magnitude. The current video frame from the motion estimator 24 is combined in a summing circuit 26 with a prior video frame from a framestore and predictor circuit 28. The resulting output, indicating the differences between corresponding blocks of pixels, is processed by a discrete cosine function 30 and quantized 32. The quantized signal is input to a variable length coder 34, the output of which is input to an output multiplexer 36. The quantized signal is also processed by an inverse quantizer circuit 38 and an inverse discrete cosine function 40 and input to another summation circuit 42. The summation circuit 42 adds the differences to the prior frame of video from the framestore and predictor 28 to generate a new prior frame for comparison with the next frame of the transformed video image signal. The predictor portion of the framestore and predictor 28 uses the motion vectors from the motion estimator 24 to modify the output of the summation circuit 42 before storage in the framestore. The motion vectors also are provided to the output multiplexer 36 for transmission together with the compressed image signal.

Figure 8:
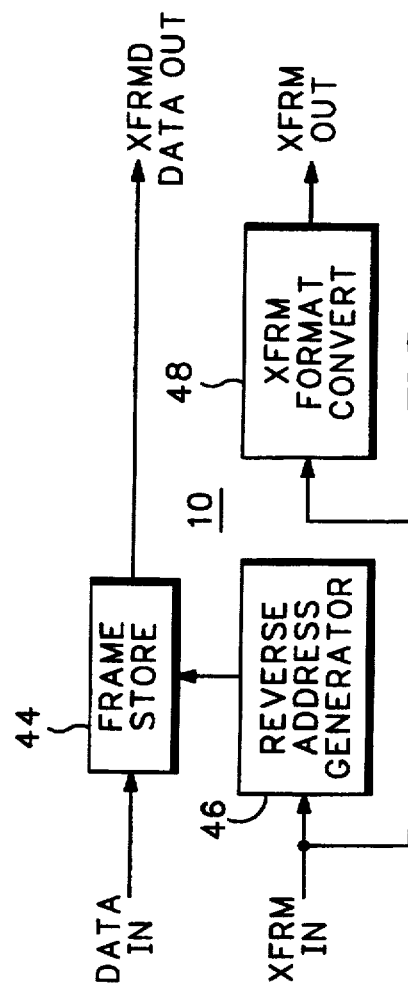
FIG. 8 is a block diagram view of a digital picture manipulator modified according to the present invention.

The digital picture manipulator 10, as shown in FIG. 8, conventionally has a frame store 44 into which the video image signal is written. A reverse address generator 46 generates readout addresses as a function of the transform indicated by an operator. Added to the conventional digital picture manipulator 10 is a transform format converter 48 for converting the transform function input by the operator into a format acceptable to the compressed video encoder 20. The format converter 48 simply converts the image transform from the DPM format to a format that is easiest for a given implementation of the motion estimator 24.

As an example of a format conversion by the format converter 48, assume that the DPM uses a 4×4 forward matrix. This image transform is used to alter a full-raster video image signal from a default position of filling a display screen to an arbitrary transformed image signal for each field. Since MPEG compressors are differential in nature, it is likely that this DPM image transform format is not appropriate, and that the MPEG compressor would rather have the image transform in a format that describes how a picture transformed at time T is transformed into a new picture at time T+ΔT rather than the image transform from full raster to new shape for each field. If an image in full raster is described by a space A, an image transformed at time T is described by a space B and transform T1 (T1(A)=B), and an image transformed at time T+ΔT is described by a space I and transform T2 (T2(A)=I), normally the DPM provides T1 with time T and T2 with time T+ΔT. However the motion estimator 24 would like a transform T3 which describes the mapping from space B to space I (T3(B)=I). Therefore T3(T1(A))=T2(A), or T3=T2(inv(T1(A))). Furthermore since the motion estimation happens on out of order, or reordered, frames, the motion estimator 24 might want to know the transform of a future frame into the current frame, which is the inverse of T3. In general the format of the transform most useful to motion estimators is determined by implementors of the compressor according to the transform format required by the compressor.

Figure 9:
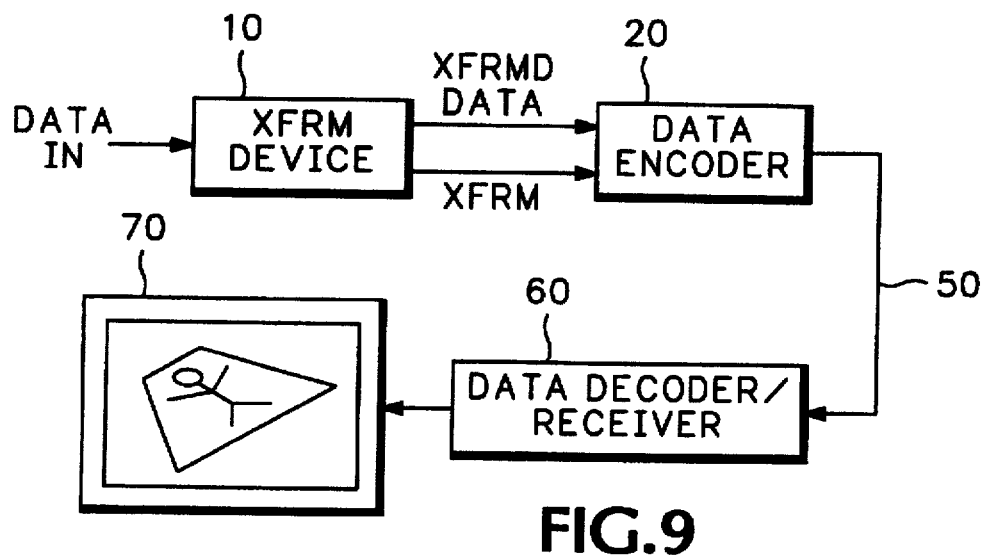
FIG. 9 is a block diagram view of a system incorporating motion vector generation according to the present invention.
Figure 10:
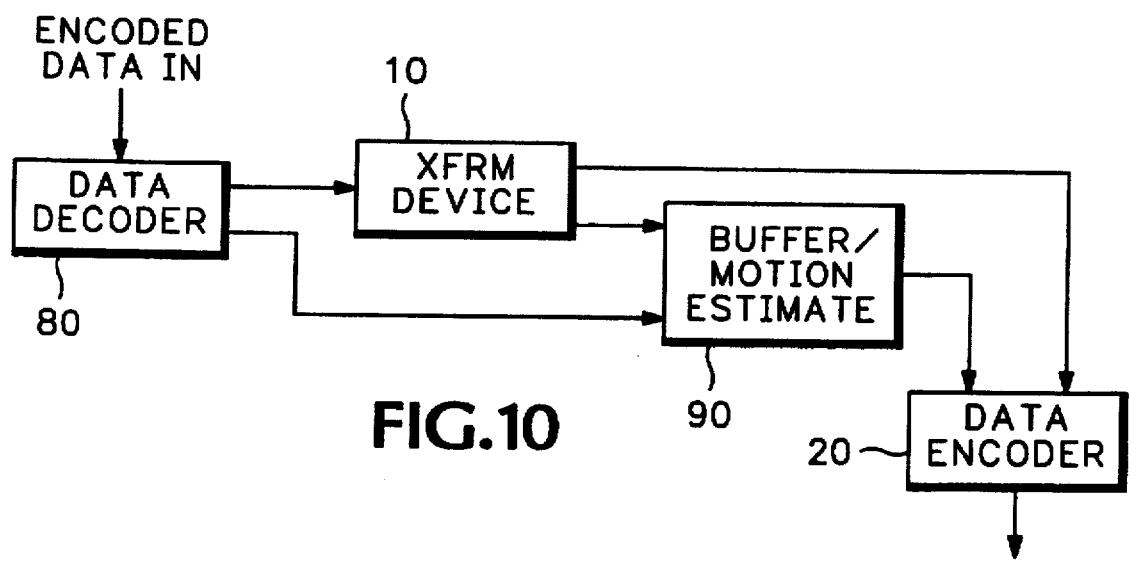
FIG. 10 is a block diagram view of another system incorporating motion vector generation according to the present invention.

For original generation of a video signal the video signal is input to the digital picture manipulator 10 as shown in FIG. 9. The digital picture manipulator 10 outputs the transformed video signal according to the specified transform function, together with the formatted transform function information, to the compressed video encoder 20. The compressed video encoder 20 compresses the transformed video signal, using the transform function information to generate motion vectors, and outputs a compressed video signal over a transmission medium 50. At the receiving end a compressed video decoder/receiver 60 processes the compressed video signal to recover the original video signal, using the motion vectors provided as part of the compressed video signal. The video signal is then output to an appropriate display 70.

For studio processing, for example, the compressed video signal is input to a compressed video decoder 80 to recover the original video signal and associated motion vectors. The compressed video decoder 80 provides the video signal as an input to the digital picture manipulator 10 and provides the motion vectors extracted from the compressed video signal to a buffer/motion estimator 90. Also input to the buffer/motion estimator 90 is the transform function information from the digital picture manipulator 10. The buffer/motion estimator 90 combines the motion vectors from the decoder 80 with the transform information from the digital picture manipulator 10 to produce updated transform function information for input to the compressed video encoder 20. Also input to the compressed video encoder 20 is the transformed video from the digital picture manipulator 10. The result is a compressed video signal output from the compressed video encoder 20 which reflects the transformation performed by the digital picture manipulator 10 as well as any prior transformations included in the original compressed video input signal.

Thus the present invention provides motion vector generation for a compressed video encoder to simplify search algorithms by providing to the compressed video encoder not only the video signal that has been manipulated by a transform function, but also information about the transform function itself.

What is claimed is:

1. A method of video image signal compression for a video image signal that is transformed according to a transform function by a digital picture manipulator comprising the steps of:

converting the transform function from the digital picture manipulator into a transform function information signal in a format acceptable to a compressed video encoder; and generating motion vectors in the compressed video encoder as a function of the transform function information signal, which motion vectors are used to compress the transformed video image signal to produce a compressed video image signal.

2. A method of video image signal compression as recited in claim 1 further comprising the step of combining the transform function information signal with a prior motion vector signal obtained from an input compressed video image signal from which the video image signal is derived to produce a modified transform function information signal as the transform function information signal for the generating step.

3. A system for video image signal compression of a video image signal including means for transforming the video image signal according to a picture manipulation transform function comprising:

means for converting the picture manipulation transform function from the transforming means into a transform function information signal in a format acceptable to a compressed video encoder; and means for generating motion vectors in the compressed video encoder as a function of the transform function information signal, which motion vectors are used to compress the transformed video image signal to produce a compressed video image signal.

4. A system for video image signal compression as recited in claim 3 further comprising means for combining the transform function information signal with a prior motion vector signal obtained from an input compressed video image signal from which the video image signal is derived to produce a modified transform function information signal as the transform function information signal for the generating means.

5. A video transmission system for transmitting a video image signal from a source to a receiver for display, the video transmission system including means for transforming the video image signal according to a picture manipulator transform function, comprising:

means in the transforming means for converting the picture manipulation transform function into a transform function information signal; and means for generating motion vectors as a function of the transform function information signal, which motion vectors are used to compress the transformed video image signal to produce a compressed video image signal for transmission over an appropriate transmission medium to the receiver.

6. A video system comprising:

means for decoding an input compressed video image signal, the input compressed video image signal including motion vectors, to produce a video image signal and a motion vector signal;

means for manipulating the video image signal according to a transform function to produce a transformed video signal;

means for converting the transform function into a transform function information signal;

means for processing the motion vector signal and the transform function information signal to produce a modified transform function information signal; and means for compressing the transformed video image signal as a function of the modified transform function information signal to produce an output compressed video image signal.

7. A video system as recited in claim 6 wherein the compressing means comprises means for generating motion vectors as a function of the modified transform function information signal, which motion vectors are used to compress the transformed video image signal to produce the output compressed video image signal.

* * * * *